(12) United States Patent
Cheng

(10) Patent No.: US 10,791,498 B2
(45) Date of Patent: Sep. 29, 2020

(54) DEVICE AND METHOD OF PERFORMING AN ACCESS CONTROL

(71) Applicant: ACER INCORPORATED, New Taipei (TW)

(72) Inventor: Ching-Wen Cheng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/244,126

(22) Filed: Jan. 10, 2019

(65) Prior Publication Data

US 2019/0223081 A1    Jul. 18, 2019

Related U.S. Application Data

(60) Provisional application No. 62/616,433, filed on Jan. 12, 2018.

(51) Int. Cl.
| | |
|---|---|
| *H04W 4/00* | (2018.01) |
| *H04W 48/06* | (2009.01) |
| *H04W 48/16* | (2009.01) |
| *H04W 48/02* | (2009.01) |
| *H04W 84/04* | (2009.01) |

(52) U.S. Cl.
CPC ........... *H04W 48/06* (2013.01); *H04W 48/02* (2013.01); *H04W 48/16* (2013.01); *H04W 84/042* (2013.01)

(58) Field of Classification Search
CPC ..... H04W 48/06; H04W 48/02; H04W 48/16; H04W 84/042
USPC ......................................... 370/329, 330, 328
See application file for complete search history.

(56) References Cited

U.S. PATENT DOCUMENTS

| | | | | |
|---|---|---|---|---|
| 2018/0288649 A1* | 10/2018 | Lee | ........................ | H04W 28/12 |
| 2018/0324673 A1* | 11/2018 | Ozturk | .................. | H04W 48/02 |
| 2019/0082376 A1* | 3/2019 | Hong | .................... | H04W 48/02 |
| 2019/0159108 A1* | 5/2019 | Lee | ........................ | H04W 48/10 |
| 2019/0174395 A1* | 6/2019 | Choe | .................... | H04W 48/16 |

FOREIGN PATENT DOCUMENTS

| | | |
|---|---|---|
| WO | 2016/006948 A1 | 1/2016 |
| WO | 2016/118282 A1 | 7/2016 |

OTHER PUBLICATIONS

LG Electronics Inc., Access category based access barring for RRC_IDLE and RRC_INACTIVE, 3GPP TSG-RAN WG2#100, Reno, USA, Nov. 27-Dec. 1, 2017, R2-1713694, pp. 1-3, XP051372357.
Intel Corporation, RAN implications of 5G Access Control requirements, 3GPP TSG RAN WG2 Meeting #99bis, Prague, Czech Republic, Oct. 9-13, 2017, R2-1710602, XP051342638.

(Continued)

*Primary Examiner* — Chuong T Ho
(74) *Attorney, Agent, or Firm* — Winston Hsu

(57) ABSTRACT

A communication device for performing an access control comprises at least one storage device and at least one processing circuit coupled to the at least one storage device. The at least one storage device stores, and the at least one processing circuit is configured to execute instructions of: detecting an access attempt; obtaining an access category corresponding to the access attempt; and performing an access barring check corresponding to the access attempt according to the access category and at least one access barring parameter.

14 Claims, 16 Drawing Sheets

(56) References Cited

OTHER PUBLICATIONS

Ericsson, Access Control for NR, 3GPP TSG-RAN WG2 #97, Athens, Greece, Feb. 13-17, 2017, Tdoc R2-1700911, pp. 1-5, XP051223298.
3GPP TS 22.261 V15.5.0 (Jun. 2018).
3GPP TS 24.301 V15.4.0 (Sep. 2018).
3GPP TS 36.331 V15.3.0 (Sep. 2018).
3GPP TS 38.300 V15.3.1 (Oct. 2018).
3GPP TS 24.501 V15.1.0 (Sep. 2018).
3GPP TS 38.331 V15.3.0 (Sep. 2018).
3GPP TS 22.011 V15.3.0 (Mar. 2018).
ZTE et al., Consideration on access control in NR, 3GPP TSG-RAN WG2 NR Ad hoc 1801, Jan. 22-26, 2018, Vancouver, Canada, R2-1800458, XP051385738.
Ericsson, Signaling of Access Control Parameters, 3GPP TSG-RAN WG2 NR AH#3, Jan. 22-26, 2018, Vancouver, Canada, Tdoc R2-1800320 (Revision of R2-1712530), XP051385655.

\* cited by examiner

```
nac-barringInfo Sequence {
    nac-BarringForCauseNameList    Sequence {
        nac-BaringForCauseName     BIT STRING (SIZE(3));
        nac-ID                     BIT STRING(SIZE(3));
        nac-BarringActivate        Boolean;
    }
    nac-BarringForRRCList          Sequence {
        nac-ID                     BIT STRING(SIZE(3));
        nac-BarringFactor          ENUMERATED;
        nac-BarringTime            ENUMERATED;
        nac-BarringActivate        Boolean;
    }
}
```

FIG. 14

```
nac-barringInfoSequence {
  nac-BarringForCauseNameList   Sequence {
    nac-BarringForCauseName     BIT STRING (SIZE(3));
    nac-IDList                  SEQUENCE (SIZE (1..maxNacID)) OF nac-BarringForRRC;
  }
  nac-BarringForRRC             Sequence {
    nac-ID                      BIT STRING(SIZE(3));
    nac-BarringActivate         Boolean;
    nac-BarringFactor           ENUMERATED{ --barring probability--};
    nac-BarringTime             ENUMERATED{ --the time period of nac barring--};
  }
}
```

FIG. 15

```
nac-barringInfo Sequence {
    nac-BarringForCauseNameList    Sequence {
        nac-BaringForCauseName     BIT STRING (SIZE(3));
        nac-ID                     BIT STRING(SIZE(3));
        nac-BarringActivate        Boolean;
    }
    nac-BarringForApplicationList  Sequence {
        nac-ID                     BIT STRING(SIZE(3));
        nac-BarringFactor          ENUMERATED;
        nac-BarringTime            ENUMERATED;
        nac-BarringActivate        Boolean;
    }
    nac-BarringForNASList          Sequence {
        nac-ID                     BIT STRING(SIZE(3));
        nac-BarringFactor          ENUMERATED;
        nac-BarringTime            ENUMERATED;
        nac-BarringActivate        Boolean;

}
    nac-BarringForRRCList          Sequence {
        nac-ID                     BIT STRING(SIZE(3));
        nac-BarringFactor          ENUMERATED;
        nac-BarringTime            ENUMERATED;
        nac-BarringActivate        Boolean;
    }
}
```

FIG. 16

DEVICE AND METHOD OF PERFORMING AN ACCESS CONTROL

CROSS REFERENCE TO RELATED APPLICATIONS

This application claims the benefit of U.S. Provisional Application No. 62/616,433 filed on Jan. 12, 2018, which is incorporated herein by reference.

BACKGROUND OF THE INVENTION

1. Field of the Invention

The present invention relates to a communication device and a method used in a wireless communication system, and more particularly, to a communication device and a method of handling an access control.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway (SGW), an access and mobility management function (AMF), a user plane function (UPF), etc., for a Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1x standard or later versions.

A fifth generation (5G) system (5GS) (e.g., 5G new radio access network (5G-NR)) is an evolution of a continuous mobile broadband process to meet the requirements of 5G as introduced by International Mobile Telecommunications (IMT)-2020. The 5GS may include a radio access network (RAN) and a core network (CN). The RAN may include at least one base station (BS). The at least one BS may include an evolved Node-B (eNB) or a 5G Node-B (gNB), for communicating with at least one UE and for communicating with the CN. The CN may include a MME, a SGW, an AMF, a UPF, etc., for a NAS control.

A network (e.g., the above E-UTRAN or 5G-NR) may apply an access control to a UE for barring an application newly initiated by the UE, e.g., when the network is in congestion. However, the application may bypass the access control, when the application is mapped to an existing Quality of Service (QoS) flow. Accordingly, the application still may trigger an UL transmission toward the network, and the congestion may be aggravated.

Thus, how to handle the access control is an important issue to be solved.

SUMMARY OF THE INVENTION

The present invention therefore provides a method and related communication device for handling an access control to solve the abovementioned problem.

A communication device for performing an access control comprises at least one storage device and at least one processing circuit coupled to the at least one storage device. The at least one storage device stores, and the at least one processing circuit is configured to execute instructions of: detecting an access attempt; obtaining an access category corresponding to the access attempt; and performing an access barring check corresponding to the access attempt according to the access category and at least one access barring parameter.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 14 is a schematic diagram of a structure of an access barring parameter according to an example of the present example.

FIG. 15 is a schematic diagram of a structure of an access barring parameter according to an example of the present example.

FIG. 16 is a schematic diagram of a structure of an access barring parameter according to an example of the present example.

DETAILED DESCRIPTION

Figure 1:
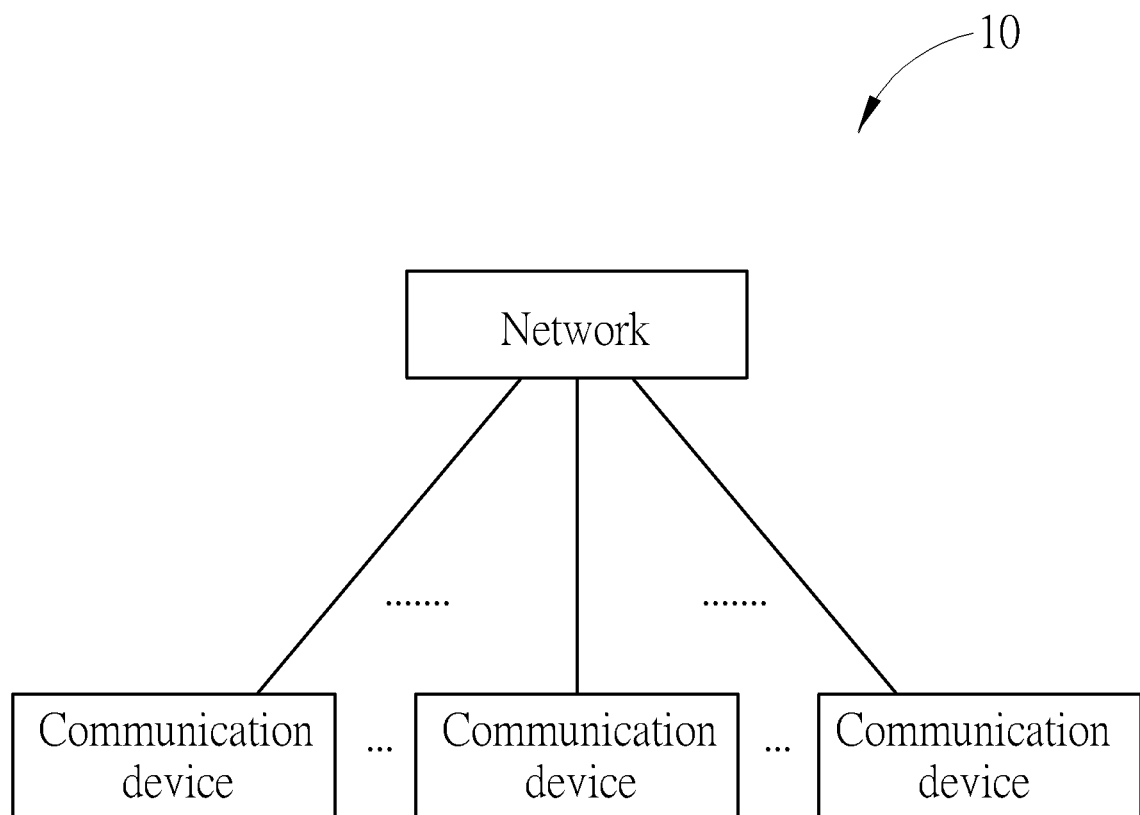
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s), licensed spectrum(s)) and/or unlicensed carrier(s) (unlicensed serving cell(s), unlicensed spectrum(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

Methods of utilizing an unlicensed carrier are various. For example, a communication system (e.g., the wireless communication system 10) which includes at least one base station (BS) may provide a wireless service via the unlicensed carrier without an assistance from a licensed serving cell, i.e., the communication system is not a LAA system. Accordingly, a communication device may communicate with the at least one BS via only the unlicensed carrier. In one example, the communication device may communicate with more than one BSs (e.g., 2) in a same time period (e.g., dual connectivity). One of the BSs may only be configured with the unlicensed carrier for the wireless service.

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In another example, the network may be an evolved UTRAN (E-UTRAN) including at least one evolved NB (eNB) and/or at least one relay in a long term evolution (LTE) system, a LTE-Advanced (LTE-A) system or an evolution of the LTE-A system. In one example, the network may be a fifth generation (5G) system (5GS) (e.g., new radio access network (5G-NR)) including at least one a 5G Node-B (gNB).

Furthermore, the network may also include both the UTRAN/E-UTRAN/5G-NR and a CN, wherein the CN may include network entities such as Mobility Management Entity (MME), Serving Gateway (S-GW), Packet Data Network (PDN) Gateway (P-GW), Self-Organizing Networks (SON) server and/or Radio Network Controller (RNC), etc., for a Non-Access Stratum (NAS) control. In other words, after the network receives information transmitted by a communication device, the information may be processed only by the UTRAN/E-UTRAN/5G-NR and decisions corresponding to the information are made at the UTRAN/E-UTRAN. Alternatively, the UTRAN/E-UTRAN/5G-NR may transmit the information to the CN, and the decisions corresponding to the information are made at the CN after the CN processes the information. In addition, the information may be processed by both the UTRAN/E-UTRAN/5G-NR and the CN, and the decisions are made after coordination and/or cooperation are performed by the A communication device may be a user equipment (UE), a low cost device (e.g., machine type communication (MTC) device), a device-to-device (D2D) communication device, a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
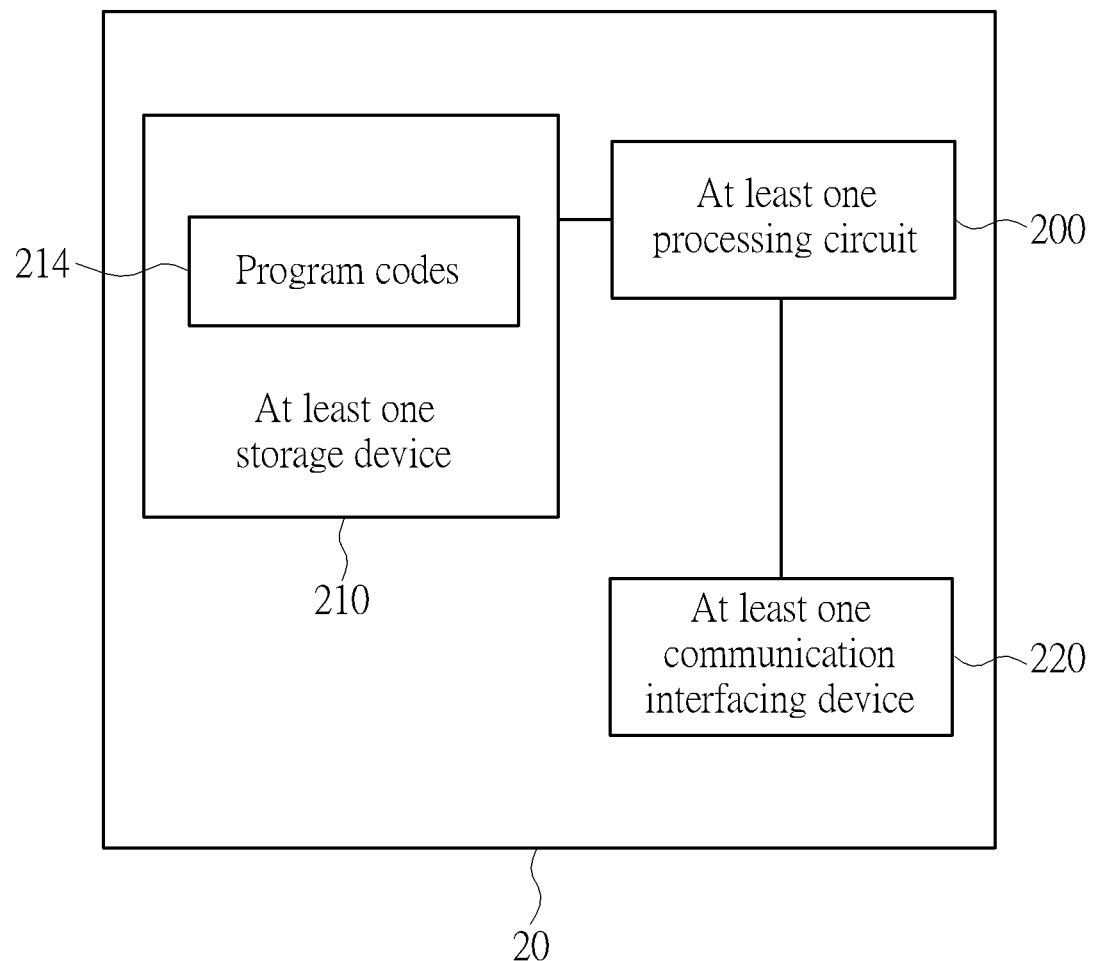
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store a program code 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably a transceiver and is used to transmit and receive signals (e.g., data, messages and/or packets) according to processing results of the at least one processing circuit 200.

Figure 3:
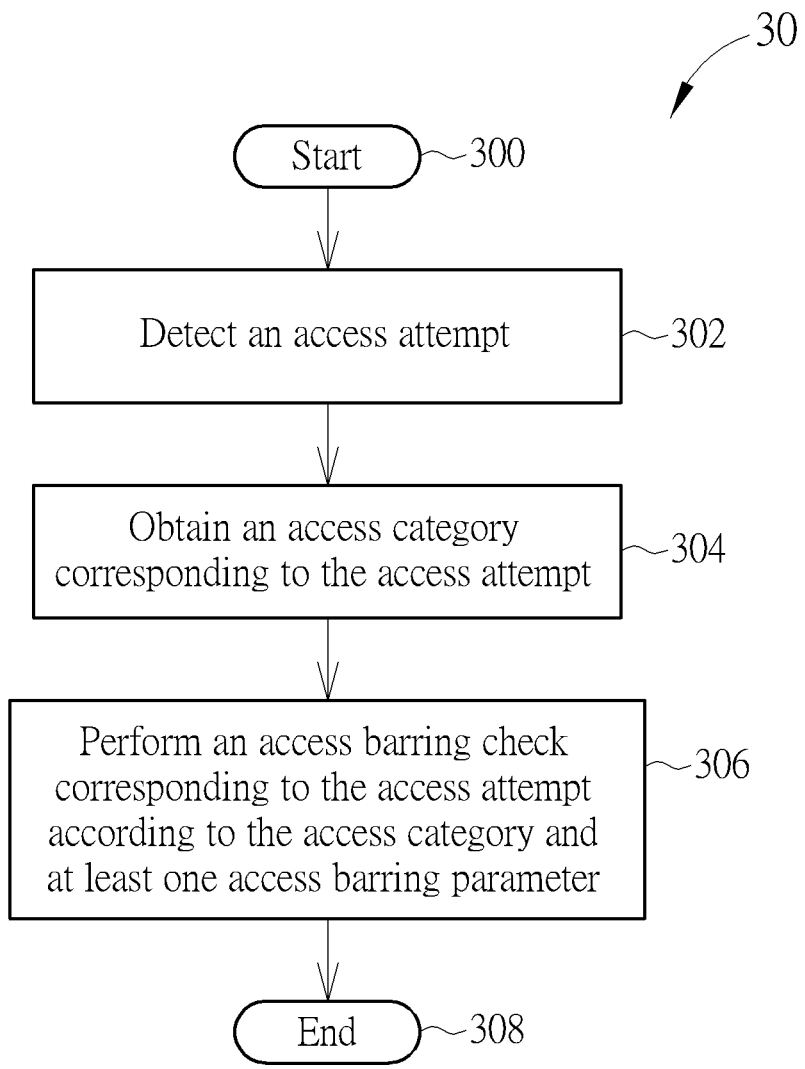
FIG. 3 is a flowchart of a process according to an example of the present invention.

FIG. 3 is a flowchart of a process 30 according to an example of the present invention. The process 30 may be utilized in a communication device (e.g., the communication device shown in FIG. 1) including an application layer, a NAS layer and a radio resource control (RRC) layer, to perform an access control. The process 30 may be compiled into the program code 214 and includes the following steps:

Step 300: Start.

Step 302: Detect an access attempt.

Step 304: Obtain an access category corresponding to the access attempt.

Step 306: Perform an access barring check corresponding to the access attempt according to the access category and at least one access barring parameter.

Step 308: End.

According to the process 30, the communication device may detect an (e.g., UL) access attempt. The communication device may obtain (e.g., determine) an access category corresponding to the access attempt. Then, the communication device may perform an access barring check corresponding to the access attempt according to the access category and at least one access barring parameter. That is, any access attempt detected by the communication device does not bypass the access barring check. Thus, the issue of the congestion resulted from bypassing the access control can be solved.

Realization of the process 30 is not limited to the above description. The following examples may be applied for realizing the process 30.

In one example, the access attempt may be detected by (e.g., in) the NAS layer. In one example, the access attempt may be detected by (e.g., in) the NAS layer according to (e.g., by using) a QoS rule, wherein the QoS rule may include a QoS rule identity (ID), a QoS Flow ID (QFI), associated QoS parameters (e.g., 5G QoS Identifier (5QI), Guaranteed Bit Rate (GBR), and Maximum Bit Rate (MBR)), at least one packet filter and/or a precedence value. Each of the at least one packet filter may include a source IP address, a destination IP address, a source port number, a destination port number, a protocol ID and/or a type of service (ToS) or a Differentiated Services Code Point (DSCP). Each packet received from a higher layer (e.g., the application layer or the NAS layer) may be mapped to a QoS flow according to the QoS rule. That is, the NAS layer maps (e.g., compares) the access attempt to at least one existing QoS flow by using the QoS rule. A new access attempt may be detected according to the QoS rule when a packet does not belong to any existing (e.g., preceding) access attempt (e.g., at least one value of the packet filter parameters of the access attempt is different from that of the existing access attempts). In one example, the access attempt may be initiated (e.g., detected) by (e.g., in) the application layer or the NAS layer. In one example, the access attempt may be initiated by at least one of service(s), application(s) and function(s) of the communication device.

In one example, the access category may be obtained (e.g., determined) by (e.g., in) the NAS layer (e.g., according to a first access category information (e.g., a first access categorizing rule and/or a first access category mapping table) received from a CN (e.g., an AMF, an operations, administration, and maintenance (OAM))). In one example, the access category may be obtained (e.g., determined) by (e.g., in) the NAS layer (e.g., according to a second access category information (e.g., a second access categorizing rule and/or a second access category mapping table) maintained (e.g., stored, predetermined) in the communication device (e.g., in a Universal Subscriber Identity Module (USIM) or a non-vulnerable memory of the communication device)). In one example, the access category may include at least one access identity (ID) associated with the access attempt. In one example, the first access category information may include a first correspondence between a first plurality of access attempts and a first plurality of access categories. The second access category information may include a second correspondence between a second plurality of access attempts and a second plurality of access categories. In one example, the first access category information and/or the second access category information may be predefined in the 3GPP standard (e.g., a Table of 5GS Access Categories of TS 22.261). The first plurality of access attempts and/or the second plurality of access attempts may be predefined in the 3GPP standard (e.g., Type of access attempt in the Table of 5GS Access Categories of TS 22.261). The first plurality of access categories and/or the second plurality of access categories may be predefined in the 3GPP standard (e.g., Access category number in the Table of 5GS Access Categories of TS 22.261). In one example, the first access category information and the second access category information may be the same or different.

In one example, the communication device may transmit a first notification message/indication (e.g., control plane (CP) message/indication) for notifying that the access attempt (e.g., the access attempt identity) has been detected to the RRC layer from the NAS layer. That is, the first notification message/indication is transmitted from the NAS layer to the RRC layer. In one example, the first notification message may or may not include the access category. In one example, the access category may or may not include the at least one access ID associated with the access attempt.

In one example, the access category may be obtained (e.g., determined) by (e.g., in) the RRC layer (e.g., according to a third access category information (e.g., a third access categorizing rule and/or a third access category mapping table)), when the first notification message does not include any access category. In one example, the access category may be obtained (e.g., determined) by (e.g., in) the RRC layer according to a third access category information (e.g., a third access categorizing rule and/or a third access category mapping table), when the access attempt is initiated by the RRC layer. The third access category may be maintained (e.g., stored) in the communication device (e.g., in a USIM or a non-vulnerable memory of the communication device). In one example, the first access category information, the second access category information and the third access category information may be the same or different. In one example, the NAS layer and the RRC layer may obtain the access category according to (e.g., by using) the same (e.g., single) access categorizing rule and the same access category mapping table. In one example, the NAS layer and the RRC layer may obtain the access category according to (e.g., by using) different (e.g., separate) access categorizing rules and the same access category mapping table.

In one example, the access barring check may be performed by (e.g., in) the RRC layer, e.g., when the access category is transmitted (e.g., notified or indicated) by the NAS layer or the application layer.

In one example, the communication device may transmit a second notification message/indication (e.g., CP message/indication) for notifying a result of the access barring check to the NAS layer from the RRC layer. That is, the second notification message/indication is transmitted from the RRC layer to the NAS layer. In one example, the result may notify that the access attempt is allowed (e.g., passed). In one example, the result may notify that the access attempt is barred. Accordingly, the access attempt may be barred for a time period of the access attempt being barred. The time period of the access attempt being barred may be predetermined in the at least one access barring parameter. In one example, the communication device may transmit a third notification message/indication for notifying that a barring for the access category is (e.g., has been) alleviated to the NAS layer from the RRC layer. That is, the third notification message/indication is transmitted from the RRC layer to the NAS layer.

In one example, the application layer and the NAS layer may be unaware of whether the access barring check is performed (e.g., activated). In one example, the application layer and the NAS layer do not (e.g., need to) know the time period (e.g., barring time, a start and/or stop time instant) of the access attempt being barred. In one example, the application layer and the NAS layer may be aware of whether the access barring check is performed. In one example, the application layer and the NAS layer knows the time period (e.g., barring time, a start and/or stop time instant) of the access attempt being barred, when receiving a notification message for notifying a result of the access barring check and receiving the time period (e.g., barring time, a start and/or stop time instant) of the access attempt being barred from the RRC layer. In one example, the application layer and the NAS layer may be unaware of the at least one access barring parameter. That is, the application layer and the NAS layer do not (need to) obtain and maintain (e.g., store) the at least one access barring parameter.

In one example, the at least one access barring parameter may be received by (e.g., in) the RRC layer from a network node (e.g., RAN or gNB). In one example, the at least one access barring parameter may be broadcasted or transmitted by the network node via system information (e.g., system information block (SIB)). In one example, the at least one access barring parameter may be maintained (e.g., stored) in the communication device (e.g., in the USIM or a non-vulnerable memory of the communication). In one example, the at least one access barring parameter may include at least one of at least one probability of at least one access attempt (e.g., "nac-BarringFactor"), at least one time period of the at least one access attempt (e.g., "nac-BarringTime") and at least one identity of the at least one access attempt (e.g., "nac-ID"), and may include at least one Boolean value of whether to activating the barring of the at least one access attempt being barred (e.g., "nac-BarringActivate").

In one example, the access barring check may be performed by the application layer or the NAS layer, when the at least one access barring parameter is transmitted (e.g., notified or indicated) to the application layer or the NAS layer from the RRC layer. That is, the at least one access barring parameter is available not only in the RRC layer, but also in the application layer or the NAS layer.

In one example, the communication device may be in a connected mode (e.g., CM_CONNECTED mode or RRC_CONNECTED mode). In one example, the communication device may be in an inactive mode or an idle mode.

Figure 4:
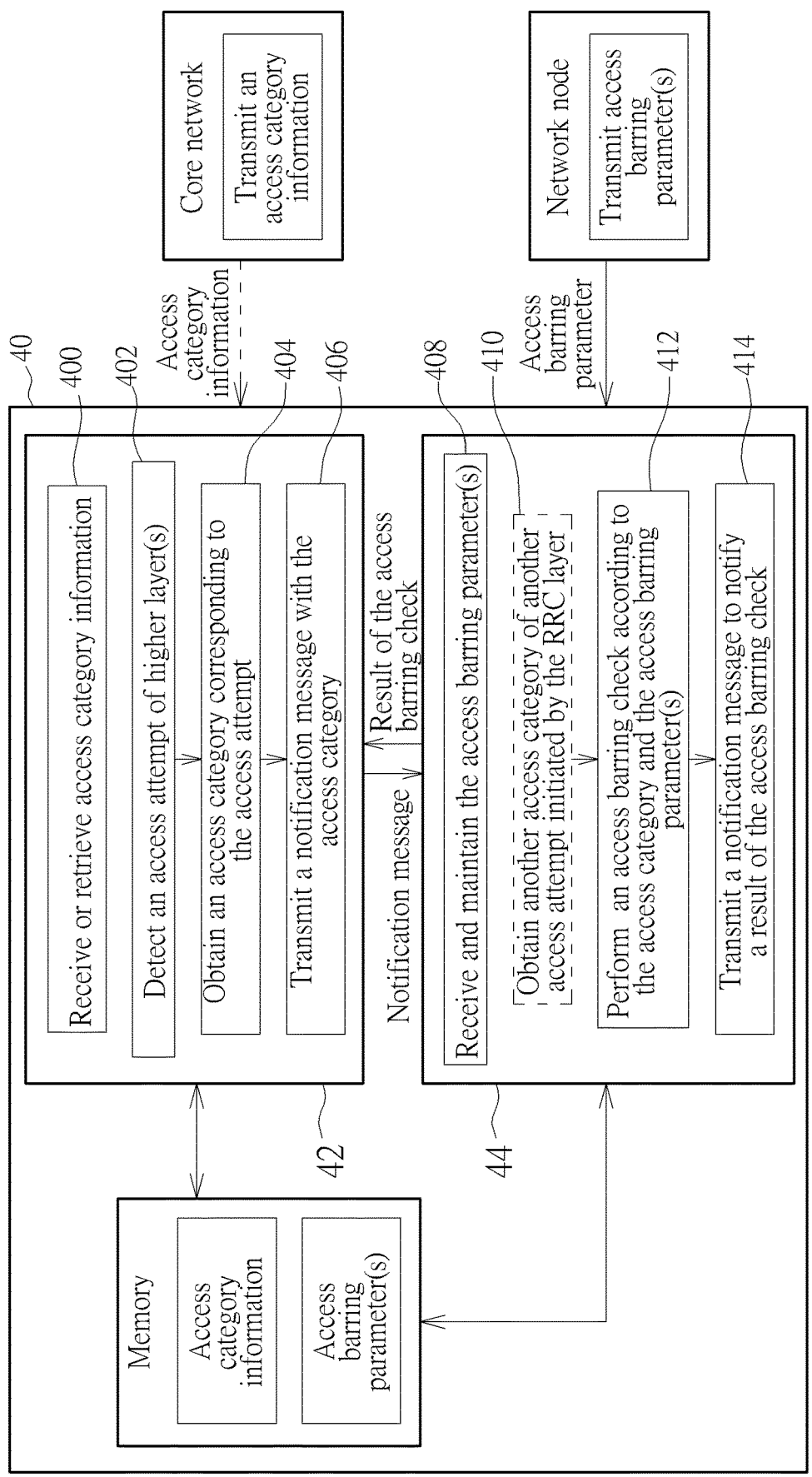
FIG. 4 is a schematic flowchart of performing an access control according to an example of the present example.

FIG. 4 is a schematic flowchart of performing an access control in a communication device 40 according to an example of the present example. The communication device 40 may comprise a higher layer 42 and a RRC layer 44. At Step 400, the higher layer 42 (e.g., an application layer or a NAS layer) may receive a first access category information from a CN (e.g., via an OAM configuration or a NAS layer configuration), or may retrieve a second access category information in a memory of the communication device 40 (e.g., USIM or non-vulnerable memory). At Step 402, the higher layer 42 detects a first access attempt of (e.g., initiated by) the higher layer 42. At Step 404, the higher layer 42 obtains a first access category corresponding to the first access attempt. At Step 406, the higher layer 42 transmits a first notification message with (e.g., including) the first access category, and may further include at least one access identity (ID) associated with the first access attempt, to notify the first access attempt to the RRC layer 44. The higher layer 42 may update the second access category information in the memory according to a third access category information (e.g., the first access category information) received from the CN.

At Step 408, the RRC layer 44 receives at least one access barring parameter from (e.g., transmitted or broadcasted by) a network node (e.g., RAN or gNB), and maintains the at least one access barring parameter (e.g., in the memory). At Step 410, the RRC layer 44 may initiate a RRC procedure corresponding to the received (e.g., first) notification message, and may further trigger a second access attempt. The RRC layer 44 may obtain a second access category of the second access attempt initiated by the RRC layer 44, e.g., by performing an access to the second access category information maintained in the memory and obtaining the second access category of the second access attempt according to the second access category information. At Step 412, the RRC layer 44 performs a first access barring check according to the first access category and the at least one access barring parameter, and/or perform a second access barring check according to the second access category and the at least one access barring parameter. At Step 414, the RRC layer 44 transmits a second notification message to notify a result of the first and/or second access barring check (e.g., the access attempt requested by higher layers, e.g., the first and/or second access attempt) is allowed or barred) to the higher layer 42.

If the NAS layer receives the second notification message for notifying the first access attempt is barred from the RRC layer 44, the NAS layer may notify the upper layer 42 (e.g., the application layer or a service layer) that the first access attempt is barred if the first access attempt was initiated by the upper layer 42.

The RRC layer 44 may transmit a third notification message to notify an alleviation of a barred access attempt (e.g., the first and/or second access attempt) and/or a barred access category (e.g., the first and/or second access category corresponding to the first and/or second access attempt), e.g., when the expiry of the time period that the barred access attempt and/or the barred access category has been barred, to the higher layer 42. If the NAS layer receives the third notification message for notifying the alleviation of the barred access attempt from the RRC layer 44, the NAS layer may notify the upper layer 42 (e.g., the application layer or the service layer) that the barring is alleviated if the barred access attempt was initiated by the upper layer 42.

That is, the RRC layer 44 is responsible for performing the first and/or second access barring check.

Figure 5:
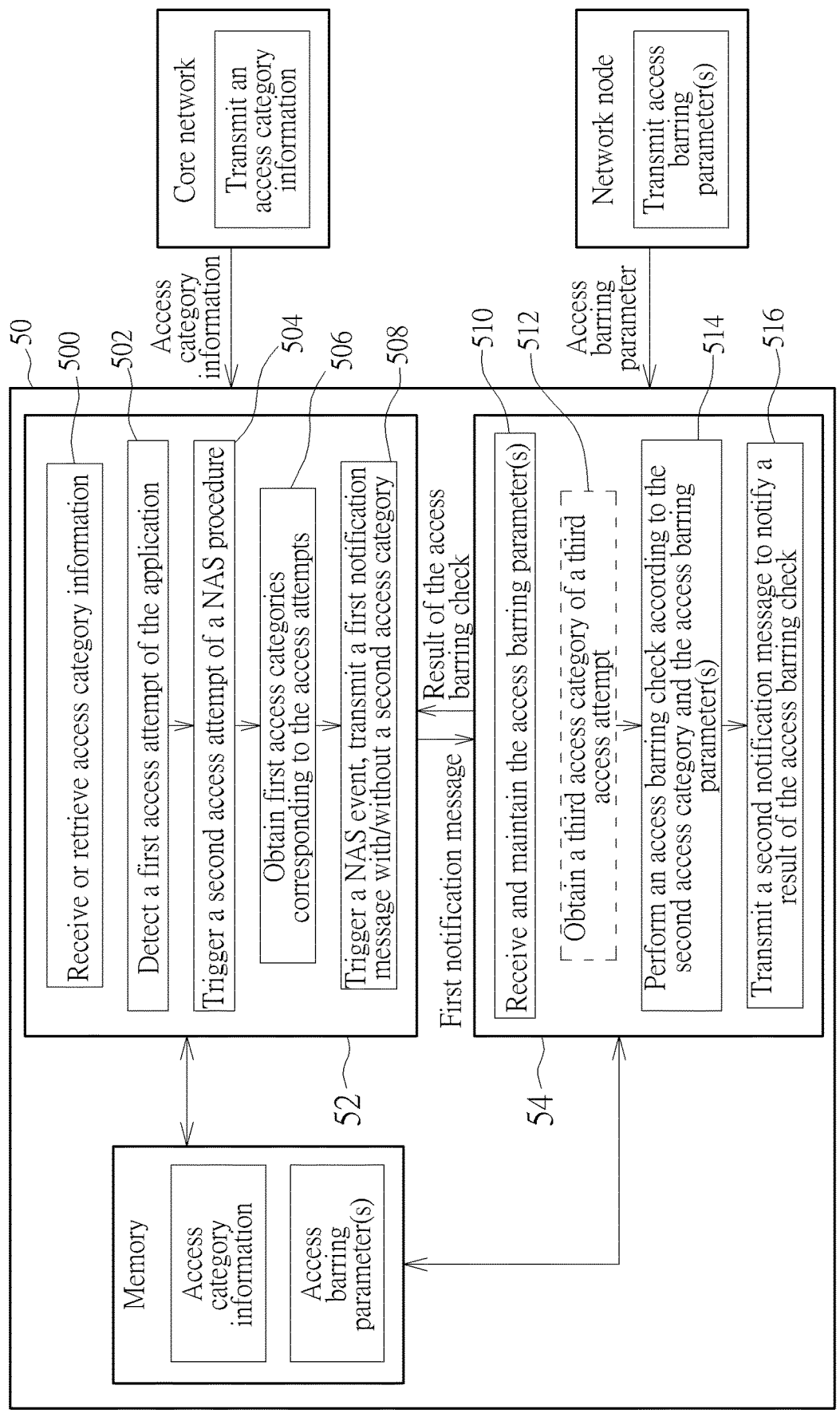
FIG. 5 is a schematic flowchart of performing an access control according to an example of the present example.

FIG. 5 is a schematic flowchart of performing an access control in a communication device 50 according to an example of the present example. The communication device 50 may comprise a NAS layer 52 and a RRC layer 54. At Step 500, the NAS layer 52 may receive a first access category information from a CN (e.g., via an OAM configuration or a NAS layer configuration), or may retrieve a second access category information in a memory of the communication device 50 (e.g., USIM or non-vulnerable memory). At Step 502, the NAS layer 52 may detect a first access attempt of (e.g., initiated by) an application. At Step 504, the NAS layer 52 may initiate a NAS procedure corresponding to the first access attempt (e.g., a Tracking Area Update (TAU) or a UE-initiated NAS transport procedure), and may further trigger a second access attempt. At Step 506, the NAS layer 52 obtains first access categories corresponding to the access attempts (the first access attempt and the second access attempt). In one example, the NAS layer 52 may obtain (e.g., select) a second access category from the first access categories for (e.g., associated with) a first notification message. At Step 508, the NAS layer 52 triggers a NAS event corresponding to the first access categories and the obtained access attempts, and transmits the first notification message corresponding to the first access categories and the obtained access attempts with or without the second access category to notify the access attempts to the RRC layer 54. The NAS layer 52 may update the second access category information in the memory according to a third access category information (e.g., the first access category information) received from the CN.

At Step 510, the RRC layer 54 receives at least one access barring parameter from (e.g., transmitted or broadcasted by) a network node (e.g., RAN or gNB), and maintains the at least one access barring parameter (e.g., in the memory). At Step 512, the RRC layer 54 may initiate a RRC procedure corresponding to the received notification message and may further trigger a third access attempt. The RRC layer 54 may obtain a third access category of the third access attempt initiated by the RRC layer 54 (e.g., by performing an access to the second access category information maintained in the memory and obtaining the third access category(ies) of the access attempts according to the second access category information). At Step 514, the RRC layer 54 performs a first access barring check according to the second access category and the at least one access barring parameter, when the second access category is received from the NAS layer 52, and/or performs a second access barring check according to the third access category and the at least one access barring parameter. At Step 516, the RRC layer 54 transmits a second notification message to notify a result of the access barring check (e.g., the access attempts requested by higher layers are allowed or barred) to the NAS layer 52. That is, the NAS layer 52 is responsible for obtaining the first access categories of the access attempts, and the RRC layer 54 is responsible for performing the first and/or second access barring check.

If the NAS layer 52 receives the second notification message for notifying the access attempts are barred from the RRC layer 54, the NAS layer 52 may notify the upper layer (e.g., the application layer or the service layer) that the access attempts are barred if the access attempts were initiated by the upper layer.

The RRC layer 54 may transmit a third notification message to notify an alleviation of a barred access attempt (e.g., the first and/or second access attempt) and/or a barred access category (e.g., the first and/or second access category corresponding to the first and/or second access attempt), e.g., when the expiry of the time period that an access attempt has been barred and/or the barred access category, to the higher layer. If the NAS layer 52 receives the third notification message for notifying the alleviation of the barred access attempt from the RRC layer 54, the NAS layer 52 may notify the upper layer (e.g., the application layer or the service layer) that the barring is alleviated if the barred access attempt was initiated by the upper layer.

Alternatively, at Step 514, the RRC layer 54 obtains a fourth access category of the access attempts initiated by the application layer and/or the NAS layer 52, when the second access category is not received from the NAS layer 52. The RRC layer 54 performs a third access barring check according to the fourth access category and the at least one access barring parameter.

Figure 6:
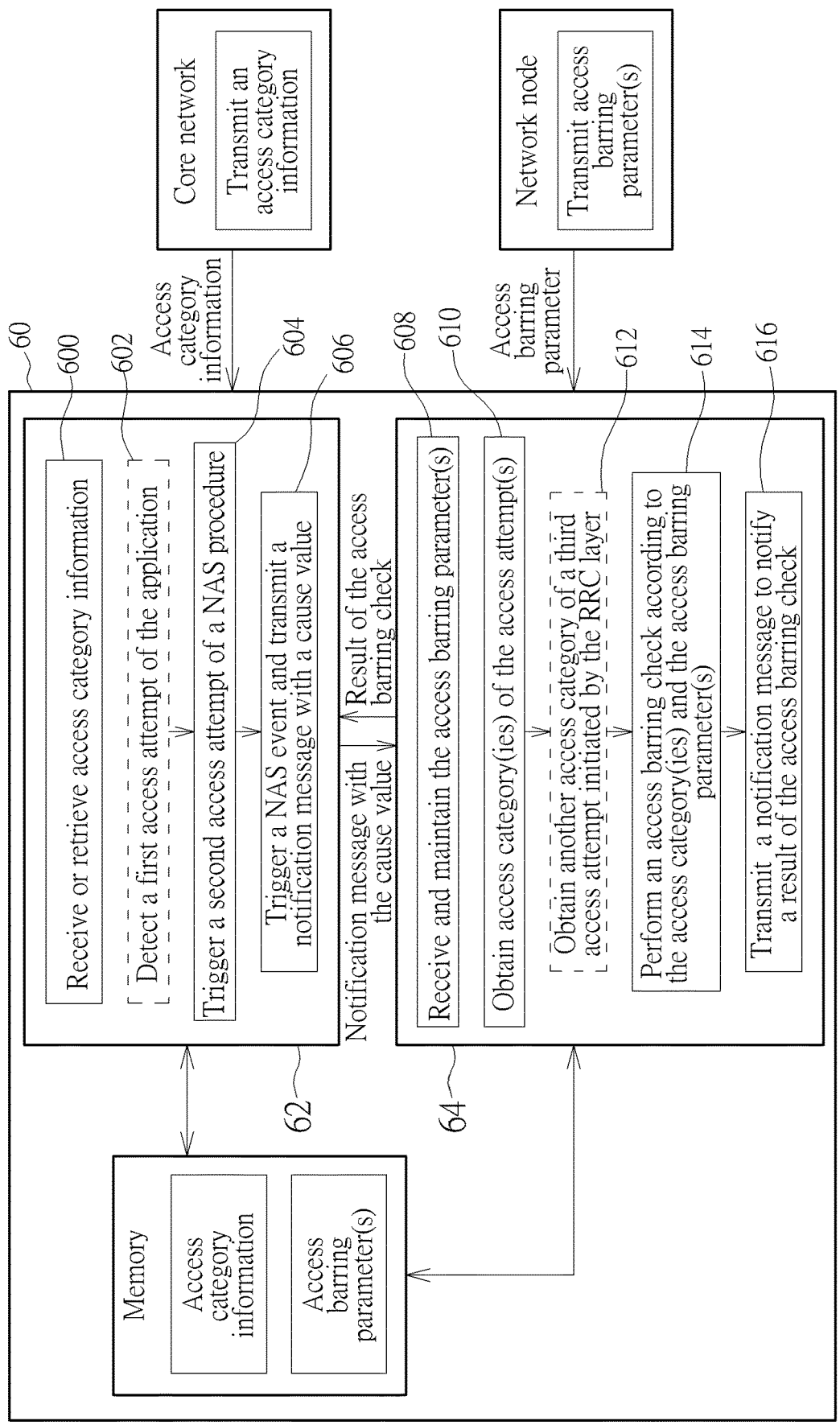
FIG. 6 is a schematic flowchart of performing an access control according to an example of the present example.

FIG. 6 is a schematic flowchart of performing an access control in a communication device 60 according to an example of the present example. The communication device 60 may comprise a NAS layer 62 and a RRC layer 64. At Step 600, the NAS layer 62 may receive a first access category information from a CN (e.g., via an OAM configuration or a NAS layer configuration), or may retrieve a second access category information in a memory of the communication device 60 (e.g., USIM or non-vulnerable memory). At Step 602, the NAS layer 62 may detect a first access attempt of (e.g., initiated by) an application (or a service). At Step 604, the NAS layer 62 may initiate a NAS procedure corresponding to the first access attempt (e.g., a TAU or a UE-initiated NAS transport procedure), and may further trigger a second access attempt. At Step 606, the NAS layer 62 triggers a NAS event and transmits a first notification message with a cause value of the access attempt(s) (the first access attempt and/or the second access attempt) to notify the access attempt(s) to the RRC layer 64. In one example, the cause value associated with the first notification message transmitted from the NAS layer 62 to the RRC layer 64 may be obtained by the NAS layer 62. The NAS layer 62 may update the second access category information in the memory according to a third access category information (e.g., the first access category information) received from the CN.

At Step 608, the RRC layer 64 receives at least one access barring parameter from (e.g., transmitted or broadcasted by) a network node (e.g., RAN or gNB), and maintains the at least one access barring parameter (e.g., in the memory). At Step 610, the RRC layer 64 obtains a first access category(ies) of the access attempt(s), e.g., by performing an access to the second access category information maintained in the memory and obtaining the first access category(ies) of the access attempt(s) according to the second access category information. At Step 612, the RRC layer 64 may initiate a RRC procedure corresponding to the received (e.g., first) notification message, and may further trigger a third access attempt. The RRC layer 64 may obtain a second access category of the third access attempt initiated by the RRC layer 64 according to (e.g., by using) the second access category information. At Step 614, the RRC layer 64 performs a first access barring check according to the first access category(ies) and the at least one access barring parameter, and/or performs a second access barring check according to the second access category and the at least one access barring parameter. At Step 616, the RRC layer 64 transmits a second notification message to notify a result of the access barring check (e.g., the access attempt(s) requested by higher layers is allowed or barred) to the NAS layer 62.

If the NAS layer 62 receives the second notification message for notifying the access attempt(s) is barred from the RRC layer 64, the NAS layer 62 may notify the upper layer (e.g., the application layer or the service layer) that the access attempt(s) is barred if the access attempt(s) was initiated by the upper layer.

The RRC layer 64 may transmit a third notification message to notify an alleviation of a barred access attempt (e.g., the first and/or second access attempt) and/or a barred access category (e.g., the first and/or second access category corresponding to the first and/or second access attempt), e.g., when the expiry of the time period that an access attempt has been barred and/or the barred access category, to the higher layer. If the NAS layer 62 receives the third notification message for notifying the alleviation of the barred access attempt from the RRC layer 64, the NAS layer 62 may notify the upper layer (e.g., the application layer or the service layer) that the barring is alleviated if the barred access attempt was initiated by the upper layer.

That is, the first access category(ies) of the access attempt(s) initiated by the application layer or the NAS layer 62 is obtained by the RRC layer 64.

Figure 7:
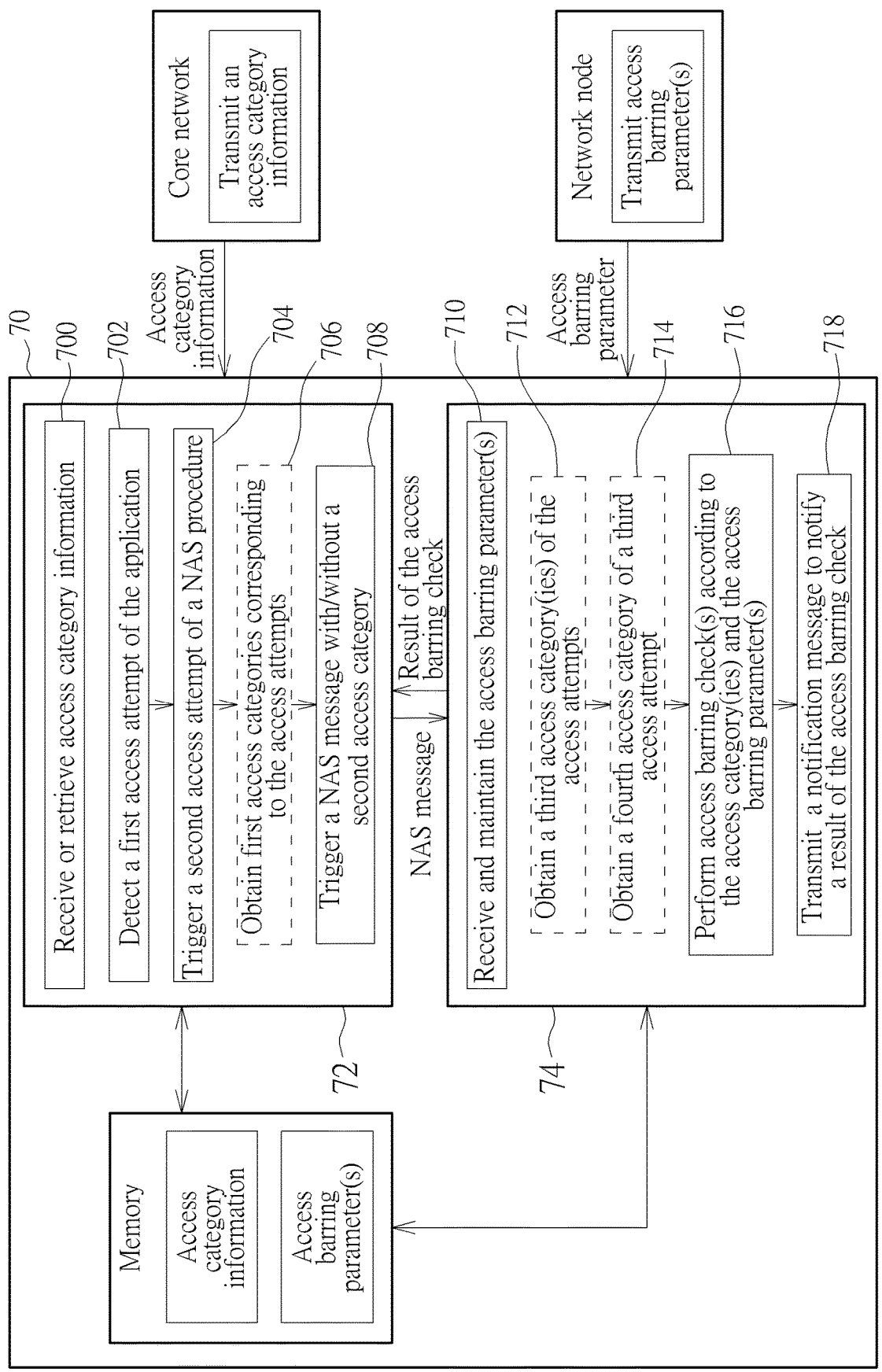
FIG. 7 is a schematic flowchart of performing an access control according to an example of the present example.

FIG. 7 is a schematic flowchart of performing an access control in a communication device 70 according to an example of the present example. The communication device 70 may comprise a NAS layer 72 and a RRC layer 74. At Step 700, the NAS layer 72 may receive a first access category information from a CN (e.g., via an OAM configuration or a NAS layer configuration), or may retrieve a second access category information in a memory of the communication device 70 (e.g., USIM or non-vulnerable memory). At Step 702, the NAS layer 72 may detect a first access attempt of (e.g., initiated by) an application (or a service). At Step 704, the NAS layer 72 may initiate a NAS procedure corresponding to the first access attempt (e.g., a TAU or a UE-initiated NAS transport procedure), and may further trigger a second access attempt. At Step 706, the NAS layer 72 may obtain first access categories corresponding to the access attempts (the first access attempt and the second access attempt). In one example, the NAS layer 72 may obtain (e.g., select) a second access category from the first access categories for a NAS message (or a first notification message). At Step 708, the NAS layer 72 triggers the NAS message (or the first notification message) corresponding to the first access categories and the obtained access attempts with or without the second access category to the RRC layer 74. The NAS layer 72 may update the second access category information in the memory according to a third access category information (e.g., the first access category information) received from the CN.

At Step 710, the RRC layer 74 receives at least one access barring parameter from (e.g., transmitted or broadcasted by) a network node (e.g., RAN or gNB), and may maintain the at least one access barring parameter (e.g., in the memory). At Step 712, the RRC layer 74 may obtain a third access category(ies) of the access attempts (e.g., by performing an access to the second access category information maintained in the memory and obtaining the third access category(ies) of the access attempts according to the second access category information), when the NAS message does not include any access category. At Step 714, the RRC layer 74 may initiate a RRC procedure corresponding to the received message (e.g., the NAS message or the first notification message), and may further trigger a third access attempt. The RRC layer 74 obtains a fourth access category of the third access attempt initiated by the RRC layer 74. At Step 716, the RRC layer 74 performs a first access barring check according to the second access category and the at least one access barring parameter, and/or perform a second access barring check according to the third access category(ies) and the at least one access barring parameter, and/or performs a third access barring check according to the fourth access category and the at least one access barring parameter. At Step 718, the RRC layer 74 transmits a second notification message to notify a result of the access barring check (e.g., the access attempts requested by higher layer are allowed or barred) to the NAS layer 72.

If the NAS layer 72 receives the second notification message for notifying the access attempts are barred from the RRC layer 74, the NAS layer 72 may notify the upper layer (e.g., the application layer or the service layer) that the access attempts are barred if the access attempts were initiated by the upper layer.

The RRC layer 74 may transmit a third notification message to notify an alleviation of a barred access attempt (e.g., the first and/or second access attempt) and/or a barred access category (e.g., the first and/or second access category corresponding to the first and/or second access attempt), e.g., when the expiry of the time period that an access attempt has been barred and/or the barred access category, to the higher layer. If the NAS layer 72 receives the third notification message for notifying the alleviation of the barred access attempt from the RRC layer 74, the NAS layer 72 may notify the upper layer (e.g., the application layer or the service layer) that the barring is alleviated if the barred access attempt were initiated by the upper layer.

Alternatively, at Step 712, the RRC layer 74 may not obtain the third access category(ies) of the access attempts, when the NAS message includes the second access category.

Figure 8:
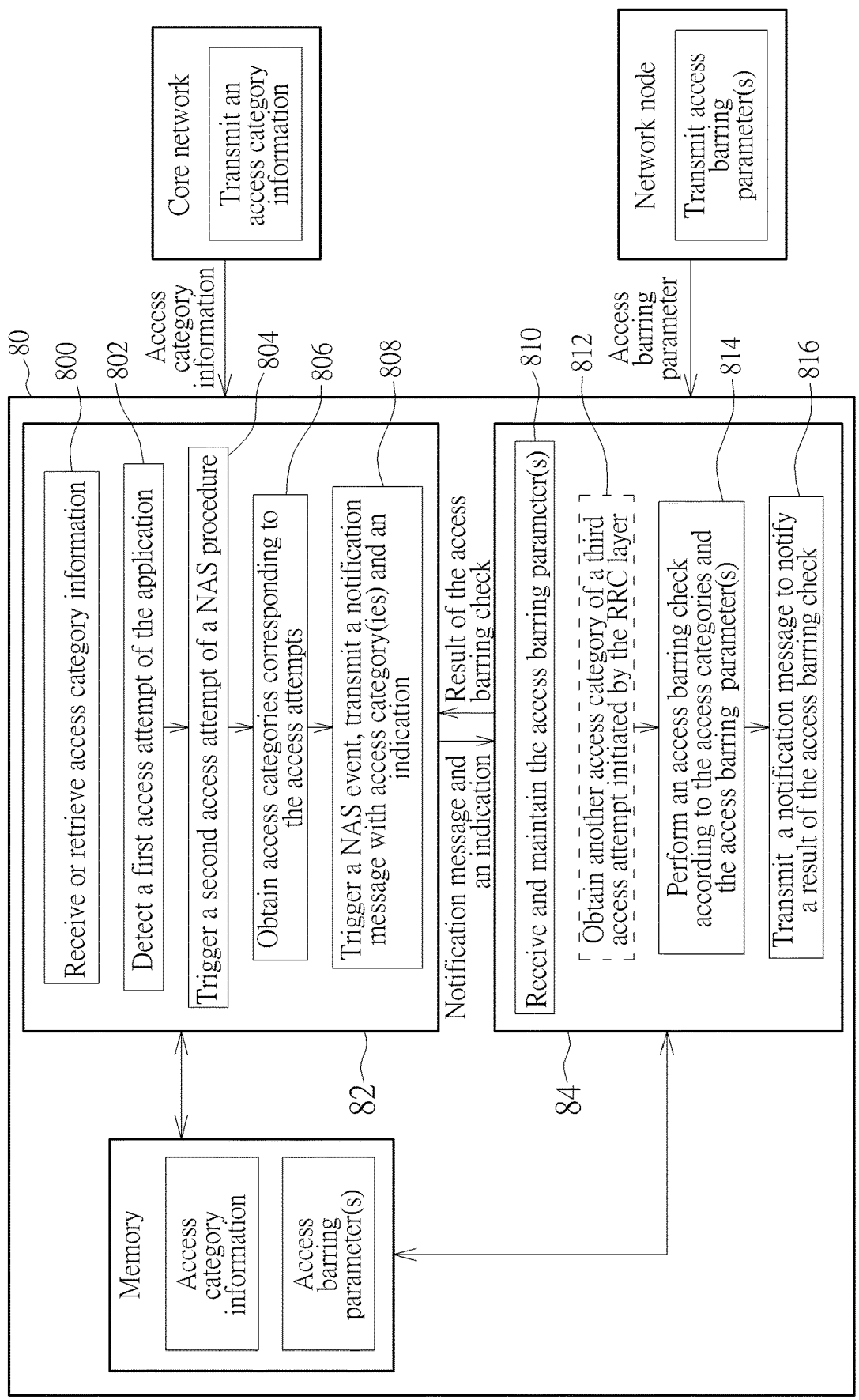
FIG. 8 is a schematic flowchart of performing an access control according to an example of the present example.

FIG. 8 is a schematic flowchart of performing an access control in a communication device 80 according to an example of the present example. The communication device 80 may comprise a NAS layer 82 and a RRC layer 84. At Step 800, the NAS layer 82 may receive a first access category information from a CN (e.g., via an OAM configuration or a NAS layer configuration), or may retrieve a second access category information in a memory of the communication device 80 (e.g., USIM or non-vulnerable memory). At Step 802, the NAS layer 82 detects a first access attempt of (e.g., initiated by) an application (or a service). At Step 804, the NAS layer 82 may initiate a NAS procedure corresponding to the first access attempt (e.g., a TAU or a UE-initiated NAS transport procedure) and may further trigger a second access attempt. At Step 806, the NAS layer 82 obtains a first access categories corresponding to the access attempts (the first access attempt and the second access attempt). In one example, the NAS layer 82 may obtain (e.g., select) a second access category from the first access categories for a first notification message. At Step 808, the NAS layer 82 triggers a NAS event corresponding to the first access categories and the obtained access attempts, transmits the first notification message with the second access category to notify the access attempts to the RRC layer 84, and transmits an indication to avoid repeating obtaining the first access categories and/or the second access category to the RRC layer 84. The NAS layer 82 may update the second access category information in the memory according to a third access category information (e.g., the first access category information) received from the CN.

At Step 810, the RRC layer 84 receives at least one access barring parameter from (e.g., transmitted or broadcasted by) a network node (e.g., RAN or gNB), and maintains the at least one access barring parameter. At Step 812, the RRC layer 84 may initiate a RRC procedure corresponding to the received (e.g., first) notification message, and may further trigger a third access attempt. The RRC layer 84 may obtain a third access category of the third access attempt initiated by the RRC layer 84 (e.g., by performing an access to the second access category information maintained in the memory and obtaining the third access category of the access attempt according to the second access category information). At Step 814, the RRC layer 84 performs a first access barring check according to the second access category and the at least one access barring parameter, and/or performs a second access barring check according to the third access category and the at least one access barring parameter. At Step 816 the RRC layer 84 transmits a second notification message to notify a result of the access barring check (e.g., the access attempts requested by higher layers are allowed or barred) to the NAS layer 82.

If the NAS layer 82 receives the second notification message for notifying the access attempts are barred from the RRC layer 84, the NAS layer 82 may notify the upper layer (e.g., the application layer or the service layer) that the access attempts are barred if the access attempts were initiated by the upper layer.

The RRC layer 84 may transmit a third notification message to notify an alleviation of a barred access attempt (e.g., the first and/or second access attempt) and/or a barred access category (e.g., the first and/or second access category corresponding to the first and/or second access attempt), e.g., when the expiry of the time period that an access attempt has been barred and/or the barred access category, to the higher layer. If the NAS layer 82 receives the third notification message for notifying the alleviation of the barred access attempt from the RRC layer 84, the NAS layer 82 may notify the upper layer (e.g., the application layer or the service layer) that the barring is alleviated if the barred access attempt was initiated by the upper layer.

That is, the RRC layer 84 is avoided repeating obtaining the access categories which has been obtained by the NAS layer 82.

Figure 9:
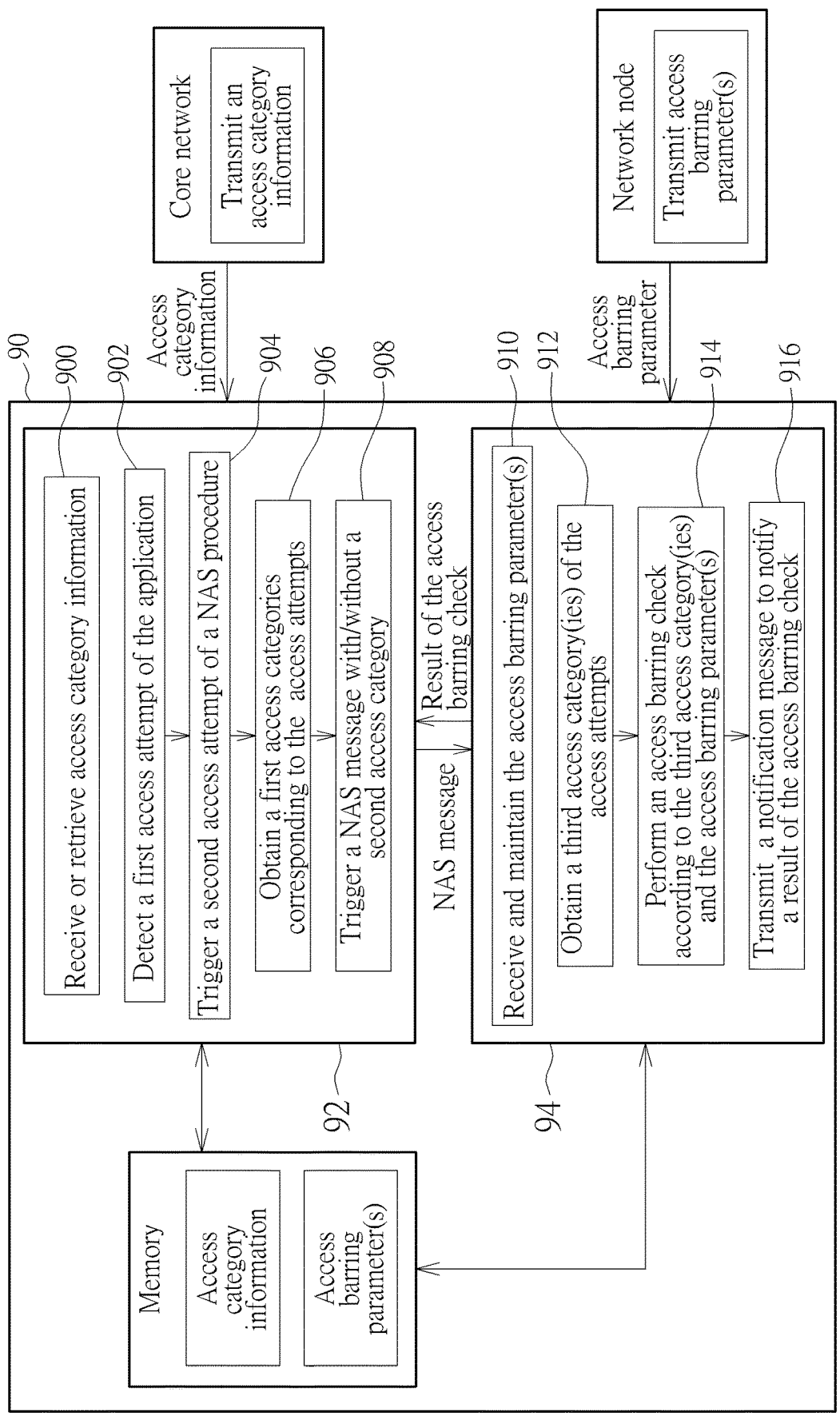
FIG. 9 is a schematic flowchart of performing an access control according to an example of the present example.

FIG. 9 is a schematic flowchart of performing an access control in a communication device 90 according to an example of the present example. The communication device 90 may comprise a NAS layer 92 and a RRC layer 94. At Step 900, the NAS layer 92 may receive a first access category information from a CN (e.g., via an OAM configuration or a NAS layer configuration), or may retrieve a second access category information in a memory of the communication device 90 (e.g., USIM or non-vulnerable memory). At Step 902, the NAS layer 92 detects a first access attempt of (e.g., initiated by) an application (or a service). At Step 904, the NAS layer 92 may initiate a NAS procedure corresponding to the first access attempt (e.g., a TAU or a UE-initiated NAS transport procedure) and may further trigger a second access attempt. At Step 906, the NAS layer 92 obtains a first access categories corresponding to the access attempts (the first access attempt and the second access attempt). In one example, the NAS layer 92 may obtain (e.g., select) a second access category from the first access categories for a NAS message (or a first notification message). At Step 908, the NAS layer 92 triggers the NAS message (or the first notification message) with or without the second access category. The NAS layer 92 may update the second access category information in the memory according to a third category information (e.g., the first access category information) received from the CN.

At Step 910, the RRC layer 94 receives at least one access barring parameter from (e.g., transmitted or broadcasted by) a network node (e.g., RAN or gNB), and maintains the at least one access barring parameter in the memory. At Step 912, the RRC layer 94 may obtain a third access category(ies) of the access attempts (e.g., by performing an access to the second access category information maintained in the memory and obtaining the third access category(ies) of the access attempts according to the second access category information). In one example, the RRC layer 94 may initiate a RRC procedure corresponding to the received message (e.g., the NAS message or the first notification message), and may further trigger a third access attempt. The RRC layer 94 may obtain a fourth access category corresponding to the third access attempt (e.g., according to the second access category information maintained in the memory). At Step 914, the RRC layer 94 performs a first access barring check according to the third access category(ies) and the at least one access barring parameter, and/or performs a second access barring check according to the fourth access category and the at least one access barring parameter. At Step 916, the RRC layer 94 transmits a second notification message to notify a result of the access barring check (e.g., the access attempts requested by higher layers are allowed or barred) to the NAS layer 92.

If the NAS layer 92 receives the second notification message for notifying the access attempts are barred from the RRC layer 94, the NAS layer 92 may notify the upper layer (e.g., the application layer or the service layer) that the access attempts are barred if the access attempts were initiated by the upper layer.

The RRC layer 94 may transmit a third notification message to notify an alleviation of a barred access attempt (e.g., the first and/or second access attempt) and/or a barred access category (e.g., the first and/or second access category corresponding to the first and/or second access attempt, e.g., when the expiry of the time period that an access attempt has been barred and/or the barred access category, to the higher layer. If the NAS layer 92 receives the third notification message for notifying the alleviation of the barred access attempt from the RRC layer 94, the NAS layer 92 may notify the upper layer (e.g., the application layer or the service layer) that the barring is alleviated if the barred access attempt was initiated by the upper layer.

That is, the third access category(ies) obtained by the RRC layer 94 take precedence over (i.e., have a priority higher than) the second category obtained by the NAS layer 92.

Figure 10:
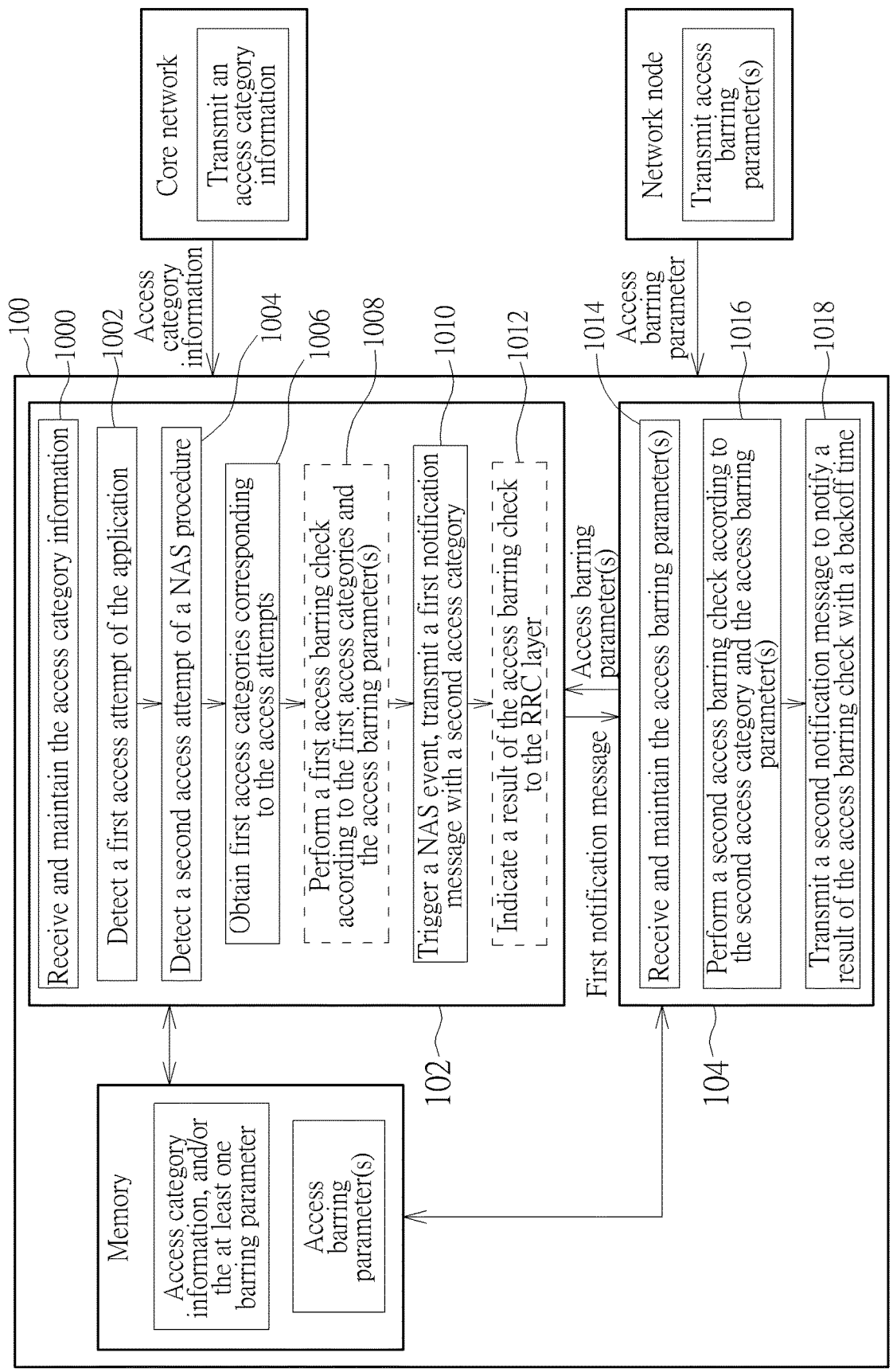
FIG. 10 is a schematic flowchart of performing an access control according to an example of the present example.

FIG. 10 is a schematic flowchart of performing an access control in a communication device 100 according to an example of the present example. The communication device 100 may comprise a NAS layer 102 and a RRC layer 104. At Step 1000, the NAS layer 102 may receive a first access category information from a CN (e.g., via an OAM configuration or a NAS layer configuration), or may retrieve a second access category information in a memory of the communication device 100 (e.g., USIM or non-vulnerable memory). At Step 1002, the NAS layer 102 detects a first access attempt of (e.g., initiated by) an application (or a service). At Step 1004, the NAS layer 102 may initiate a NAS procedure corresponding to the first access attempt (e.g., a TAU or a UE-initiated NAS transport procedure) and may further trigger a second access attempt. At Step 1006, the NAS layer 102 obtains first access categories corresponding to the access attempts (the first access attempt and the second access attempt). At Step 1008, the NAS layer 102 may perform a first access barring check according to the first access categories and at least one access barring parameter received from the RRC layer 104. In one example, the NAS layer 102 may obtain (e.g., select) a second access category associated with the access attempts, for a NAS message or a first notification message. At Step 1010, the NAS layer 102 triggers a NAS event and transmits the first notification message with the second access category to the RRC layer 104. At Step 1012, the NAS layer 102 may indicate a result of the first access barring check (e.g., the access attempts initiated by the application layer or the NAS layer 102 are allowed or barred) to the RRC layer 104 in the first notification message. The NAS layer 102 may indicate an exemption indicator to the RRC layer 104 in the first notification message, if the NAS layer 102 has performed the first access barring check for the access attempts. The NAS layer 102 may update the second access category information in the memory according to a third access category information (e.g., the first access category information) received from the CN.

At Step 1014, the RRC layer 104 may receive the at least one access barring parameter from (e.g., transmitted or broadcasted by) a network node (e.g., RAN or gNB), and may maintain the at least one access barring parameter in the memory. At Step 1016, the RRC layer 104 performs a second access barring check according to the second access category (e.g., received from the NAS layer 102 or via the OAM configuration) and the at least one access barring parameter, when the first notification message was received without an exemption indicator. At Step 1018, if the second access barring check was performed in the RRC layer 104, the RRC layer 104 transmits a second notification message to notify a result of the second access barring check (e.g., the access attempts are allowed or barred) to the NAS layer 102 with a backoff time.

If the NAS layer 102 receives the second notification message for notifying the access attempts are barred from the RRC layer 104, the NAS layer 102 may notify the upper layer (e.g., the application layer or the service layer) that the access attempts are barred if the access attempts were initiated by the upper layer.

The RRC layer 104 may transmit a third notification message to notify an alleviation of a barred access attempt (e.g., the first and/or second access attempt) and/or a barred access category (e.g., the first and/or second access category corresponding to the first and/or second access attempt), e.g., when the expiry of the time period that an access attempt has been barred and/or the barred access category, to the higher layer. If the NAS layer 102 receives the third notification message for notifying the alleviation of the barred access attempt from the RRC layer 104, the NAS layer 102 may notify the upper layer (e.g., the application layer or the service layer) that the barring is alleviated if the barred access attempt was initiated by the upper layer.

That is, the NAS layer 102 performs the access barring check and the RRC layer 104 performs the other access barring check, respectively (e.g., separately).

Figure 11:
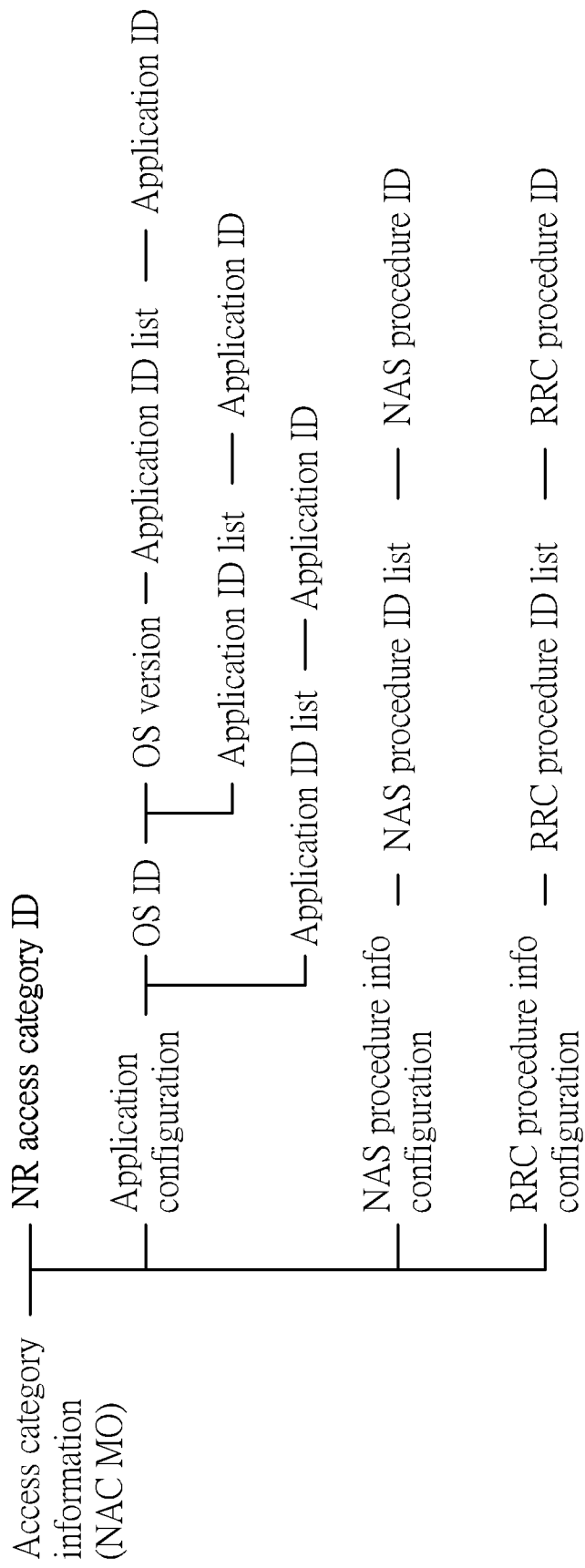
FIG. 11 is a schematic diagram of a structure of an access category information according to an example of the present example.

FIG. 11 is a schematic diagram of a structure of an access category information (e.g., the first and/or second access category information mentioned above) according to an example of the present example. The access category information may be a NR access category (NAC) management object (MO). The NAC MO may include at least one NAC MO instance. Each of the at least one NAC MO instance may include at least one of a NR access category ID, an Application configuration, a NAS procedure info configuration, and a RRC procedure info configuration. The Application configuration may include at least one of an operating system (OS) ID, and an Application ID list including at least one Application ID. The OS ID may further include at least one of an OS version, and the Application ID list including the at least one Application ID. The Application ID may further include at least one Application version. The OS version may or may not include the Application ID list. The NAS procedure info configuration may include a NAS procedure ID list including at least one NAS procedure ID. The RRC procedure info configuration may include an RRC procedure ID list including at least one RRC procedure ID.

Figure 12:
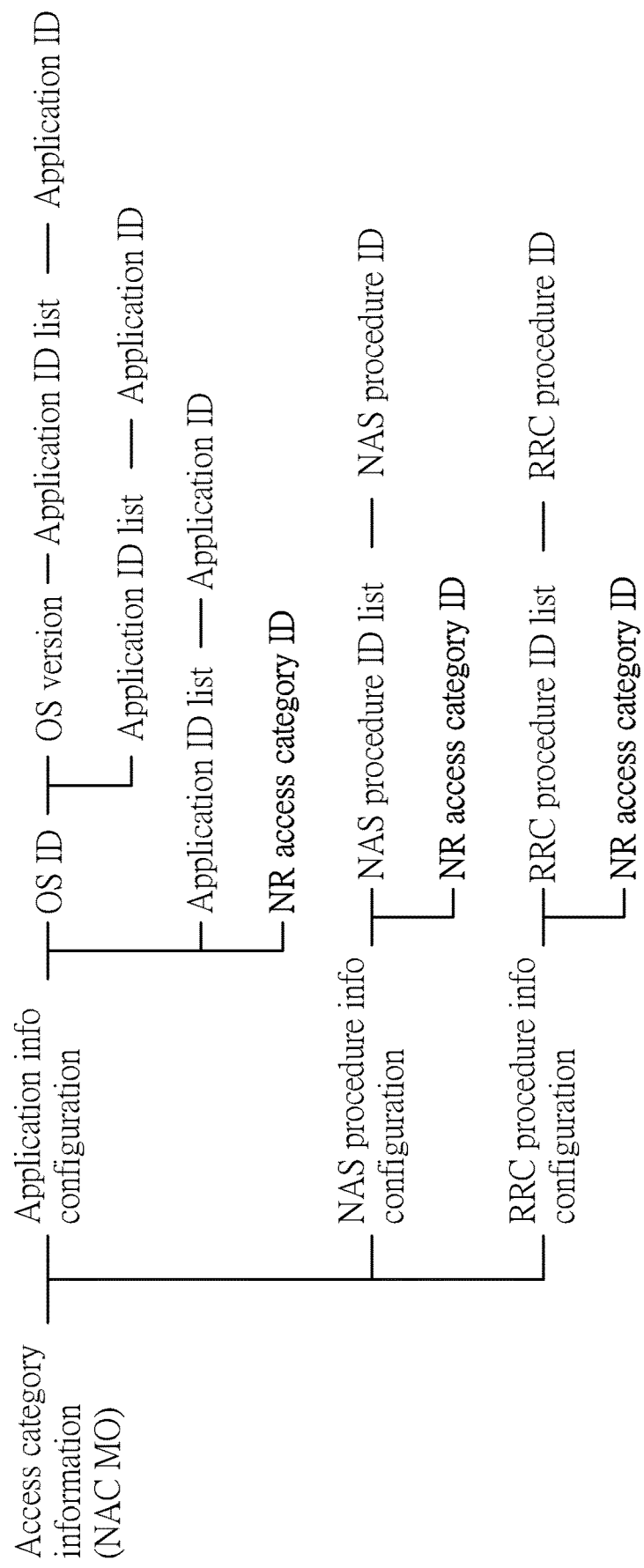
FIG. 12 is a schematic diagram of a structure of an access category information according to an example of the present example.

FIG. 12 is a schematic diagram of a structure of an access category information (e.g., the first and/or second access category information mentioned above) according to an example of the present example. The access category information may be a NAC MO. The NAC MO may include at least one of an Application configuration, a NAS procedure info configuration, and a RRC procedure info configuration. The Application configuration may include at least one of an OS ID, an Application ID list including at least one Application ID, and a NR access category ID. The OS ID may further include at least one of an OS version, and the Application ID list including the at least one Application ID. The Application ID may further include at least one Application version. The OS version may or may not include the Application ID list including the at least one Application ID. The NAS procedure info configuration may include at least one of an NAS procedure ID list including at least one NAS procedure ID, and the NR access category ID. The RRC procedure info configuration include at least one of an RRC procedure ID list including at least one RRC procedure ID, and the NR access category ID.

Figure 13:
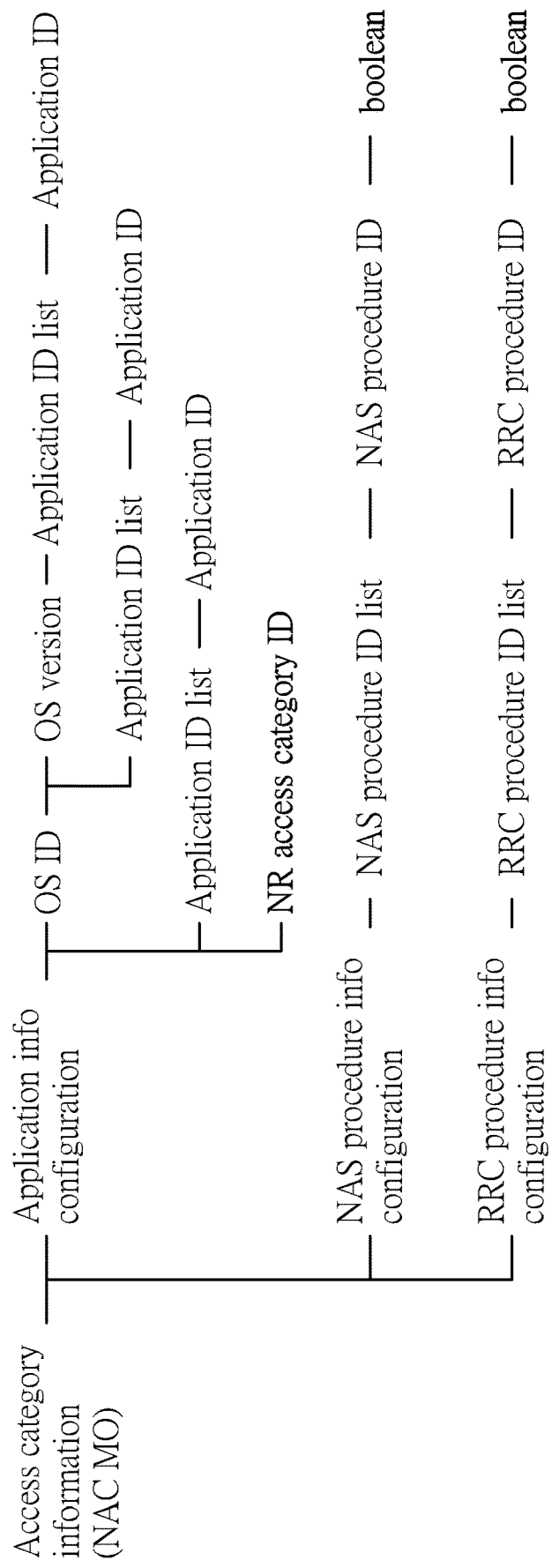
FIG. 13 is a schematic diagram of a structure of an access category information according to an example of the present example.

FIG. 13 is a schematic diagram of a structure of an access category information (e.g., the first and/or second access category information mentioned above) according to an example of the present example. The access category information may be a NAC MO. The NAC MO may include at least one of an Application configuration, a NAS procedure info configuration, and a RRC procedure info configuration. The Application configuration may include at least one of an OS ID, an Application ID list including at least one Application ID, and a NR access category ID. The OS ID may further include at least one of an OS version, and the Application ID list including the at least one Application ID. The Application ID may further include at least one Application version. The OS version may or may not include the Application ID list including the at least one Application ID. The NAS procedure info configuration may or may not include an NAS procedure ID list including at least one NAS procedure ID. Each of the at least one NAS procedure ID may or may not include a Boolean value indicating whether an access attempt of the NAS procedure is barred. The RRC procedure info configuration may or may not include an RRC procedure ID list including at least one RRC procedure ID. Each of the at least one RCC message ID may or may not include a Boolean value indicating whether an access attempt of the RRC procedure is barred.

FIG. 14 is a schematic diagram of a structure of an access barring parameter (e.g., the at least one access barring parameter mentioned above) according to an example of the present example. The access barring parameter may include a "nac-barringInfoSequence", which may be a RRC-based access barring parameter. The "nac-barringInfoSequence" may include 2 sub-sequences. The first sub-sequence may be a "nac-BarringForCauseNameList", which may include a "nac-BarringForCauseName" indicating an access category, a "nac-ID" indicating at least one access identity corresponding to the access category, and a "nac-BarringActivate" represented by at least one Boolean value indicating whether to activate the at least one access identity. Accordingly, barring information corresponding to the access category may be obtained according to the first sub-sequence of the access barring parameter. The second sub-sequence may be a "nac-BarringForRRCList", which may include a "nac-ID" indicating an access identity, a "nac-BarringFactor" indicating a barring probability corresponding to the access identity, a "nac-BarringTime" indicating a barring time period corresponding to the access identity, and a "nac-BarringActivate" represented by a Boolean value indicating whether to activate the access identity. Accordingly, barring information corresponding to the access identity may be obtained according to the second sub-sequence of the access barring parameter.

FIG. 15 is a schematic diagram of a structure of an access barring parameter (e.g., the at least one access barring parameter mentioned above) according to an example of the present example. The access barring parameter may include a "nac-barringInfoSequence", which may be a RRC-based access barring parameter. The "nac-barringInfoSequence" may include a first sub-sequence "nac-BarringForCauseNameList", which may include a "nac-BarringForCauseName" indicating an access category, a "nac-IDList" including at least one sequence of a "nac-ID" and a "nac-BarringActivate". The "nac-ID" indicates the access identity corresponding to the access category, and the "nac-BarringActivate" represented by at least one Boolean value indicates whether to subject the at least one access identity associated with the "nac-ID" to access barring check. Accordingly, barring information corresponding to the access category may be obtained according to the first sub-sequence of the access barring parameter. The "nac-barringInfoSequence" may include a second sub-sequence "nac-BarringForRRCList", which may include a "nac-IDList" including at least one sequence of a "nac-ID", a "nac-BarringActivate", a nac-BarringFactor, and a nac-BarringTime. The "nac-ID" indicates an access identity, the "nac-BarringFactor" indicates a barring probability corresponding to the access identity, the "nac-BarringTime"

indicates a barring time period corresponding to the access identity, and the "nac-BarringActivate" represented by a Boolean value indicates whether to subject the access identity associated with the "nac-ID" to access barring check. Accordingly, barring information corresponding to the access identity may be obtained according to the second sub-sequence of the access barring parameter.

FIG. 16 is a schematic diagram of a structure of an access barring parameter (e.g., the at least one access barring parameter mentioned above) according to an example of the present example. The access barring parameter may include a "nac-barringInfoSequence", which may be a layer-specific access barring parameter. The "nac-barringInfoSequence" may include 4 sub-sequences.

The first sub-sequence may be a "nac-BarringForCause-NameList", which may include a "nac-BarringForCause-Name" indicating an access category, a "nac-IDList" including at least one sequence of a "nac-ID", a "nac-BarringActivate", and may include a "nac-BarringFactor", and a "nac-BarringTime". The "nac-ID" indicates at least one access identity corresponding to the "nac-BarringForCauseName", and a "nac-BarringActivate" represented by at least one Boolean value indicates whether to subject the access identity associated with the "nac-ID" to access barring check. Accordingly, barring information corresponding to the access category may be obtained according to the first sub-sequence of the access barring parameter. The first sub-sequence may be shared by each layer of the communication device. The second sub-sequence may be a "nac-BarringForApplicationList", which may include a "nac-IDList" including at least one sequence of a "nac-ID", a "nac-BarringFactor", a "nac-BarringTime", and "nac-BarringActivate". The "nac-ID" indicates an access identity, a "nac-BarringFactor" indicates a barring probability corresponding to the access identity, a "nac-BarringTime" indicates a barring time period corresponding to the access identity, and a "nac-BarringActivate" represented by a Boolean value indicates whether to subject the access identity associated with the "nac-ID" to access barring check, barring information corresponding to the access identity of an application layer may be obtained according to the second sub-sequence of the access barring parameter.

The third sub-sequence may be a "nac-BarringForNASList", which may include a "nac-IDList" including at least one sequence of a "nac-ID", a "nac-BarringActivate", a "nac-BarringFactor", and a "nac-BarringTime". The "nac-ID" indicates an access identity, a "nac-BarringFactor" indicates a barring probability corresponding to the access identity, a "nac-BarringTime" indicates a barring time period corresponding to the access identity, and a "nac-BarringActivate" represented by a Boolean value indicates whether to subject the access identity associated with the "nac-ID" to access barring check. Accordingly, barring information corresponding to the access identity of a NAS layer may be obtained according to the third sub-sequence of the access barring parameter. The fourth sequence may be a "nac-BarringForRRCList", which may include a "nac-IDList" including at least one sequence of a "nac-ID", a "nac-BarringActivate", a "nac-BarringFactor", and a "nac-BarringTime". The "nac-ID" indicates an access identity, a "nac-BarringFactor" indicates a barring probability corresponding to the access identity, a "nac-BarringTime" indicates a barring time period corresponding to the access identity, and a "nac-BarringActivate" represented by a Boolean value indicates whether to subject the access identity associated with the "nac-ID" to access barring check. Accordingly, barring information corresponding to the access identity of a RRC layer may be obtained according to the fourth sub-sequence of the access barring parameter.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method and related communication device for performing the access control. Accordingly, any access attempt detected by the communication device does not bypass the access barring check. Thus, the issue of congestion resulting from bypassing the access control can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device comprising an application layer, a Non-Access-Stratum (NAS) layer and a radio resource control (RRC) layer, for performing an access control, comprising:
    at least one storage device; and
    at least one processing circuit, coupled to the at least one storage device, wherein the at least one storage device stores, and the at least one processing circuit is configured to execute instructions of:
detecting an access attempt;
obtaining an access category corresponding to the access attempt; and
performing an access barring check corresponding to the access attempt according to the access category and at least one access barring parameter;
wherein the access attempt is detected by the NAS layer.

2. The communication device of claim 1, wherein the access category comprises at least one access identity (ID) associated with the access attempt.

3. The communication device of claim 1, wherein the access category is obtained by the NAS layer.

4. The communication device of claim 1, wherein the instructions further comprise:
transmitting a first notification message for notifying that the access attempt has been detected to the RRC layer from the NAS layer.

5. The communication device of claim 4, wherein the first notification message comprises the access category.

6. The communication device of claim 5, wherein the access category comprises at least one access ID associated with the access attempt.

7. The communication device of claim 4, wherein the access category is obtained by the RRC layer, when the first notification message does not comprise any access category.

8. The communication device of claim 1, wherein the access barring check is performed by the RRC layer.

9. The communication device of claim 8, wherein the instructions further comprise:
transmitting a second notification message for notifying a result of the access barring check to the NAS layer from the RRC layer.

10. The communication device of claim 9, wherein the instructions further comprises:
transmitting a third notification message for notifying that a barring for the access category is alleviated to the NAS layer from the RRC layer.

11. The communication device of claim 1, wherein the at least one access barring parameter is received by the RRC layer from a network node.

12. The communication device of claim 1, wherein the at least one access barring parameter comprises at least one of at least one probability of at least one access attempt, at least one time period of the at least one access attempt, and at least one identity of the at least one access attempt.

13. The communication device of claim 1, wherein the access barring check is performed by the application layer or the NAS layer, when the at least one access barring parameter is transmitted to the application layer or the NAS layer from the RRC layer.

14. The communication device of claim 1, wherein the communication device is in a connected mode, an inactive mode or an idle mode.

* * * * *